Figure 1:
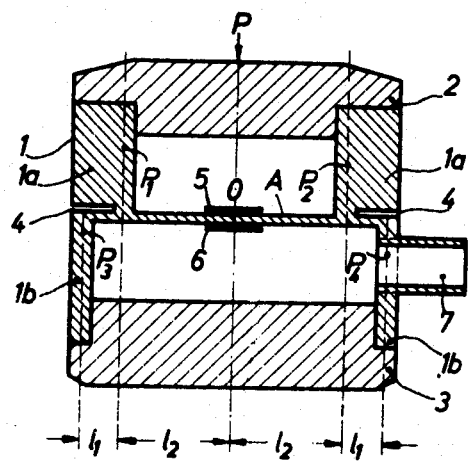

Nov. 30, 1965      R. ZIGGEL      3,221,283
PRESSURE-MEASURING BOXES
Filed Sept. 18, 1961

INVENTOR
ROBERT ZIGGEL

BY
AGENT

United States Patent Office 3,221,283
Patented Nov. 30, 1965

3,221,283
PRESSURE-MEASURING BOXES
Robert Ziggel, Hamburg-Wandsbek, Germany, assignor to
North American Philips Company, Inc., New York,
N.Y., a corporation of Delaware
Filed Sept. 18, 1961, Ser. No. 138,929
Claims priority, application Germany, Oct. 20, 1960,
P 25,885
4 Claims. (Cl. 338—4)

In pressure-measuring boxes known heretofore, a cylinder or rod is provided bearing strain gauges and loaded in an axial direction. In this case it is necessary to distribute the active gauges in the direction of force and compensation gauges which need not be entirely passive at right angles to the direction of force on the circumference.

The drawbacks of such a construction are that the transmission of the measured force occurs asymmetrically, since two gauges are entirely active and two gauges are only partially active. An electrical symmetrical symmetrized bridge is therefore controlled and influenced by a mechanically system which is asymmetrical in every respect.

The mounting of the boxes should be carried out with great care and sometimes requires considerable adjustment operations in order to avoid errors resulting from an asymmetrically acting force.

Also diametrically arranged measuring ganges are only to a limited extent capable of compensating for such errors. In order to obtain a somewhat homogeneous flux of force in the rod or cylinder, a certain height is required. Together with the additional apparatus required for more accurate measurements, constructions are sometimes obtained which are so high that they can no longer be housed. In addition, the stability of the zero point is insufficient.

In addition, in contrast with an ideal punctiform concentration, the gauges are spaced comparatively far apart, as a result of which a further deterioration of the stability of the zero point arises when a temperature gradient occurs.

From the arrangement of the gauges in the direction of force, an insufficient behaviour occurs in the case of dynamic-processes. In the case of larger boxes, numerous measuring gauges must be provided, as a result of which the susceptibility of repair increases to the same extent.

The pressure-measuring box according to the invention overcomes the above drawback in that between the surfaces receiving the pressure a tube with alternately different wall thickness is provided and the sections are divided by a transverse surface receiving the extension measuring gauges.

In the new pressure-measuring box, all the gauges are active nearly to the same extent. In addition, the arrangement of the gauges is nearly punctiform and occurs at right angles to the direction of force, so that the geometric facts do not influence the zero point. The pressure-measuring box in accordance with the invention has a small structural height and also mechanical mounting deficiences have no influence since in all the parts an extraordinarily satisfactory symmetry is guaranteed.

In order that the invention may readily be carried into effect, one embodiment thereof will now be described, by way of example, with reference to the accompanying drawing.

Figure 2:

FIG. 1 is sectional diagrammatic view of the pressure measuring box constructed in accordance with the teachings of the present invention and FIG. 2 is a diagrammatic view of a helical, double measuring wire.

A preferably cylindrical tube 1 comprises surfaces 2 and 3 for receiving pressure, for example, a diaphragm. The wall thicknesses of the tube 1 are different at $1a$ and $1b$. Between these two wall sections lies a transverse surface A, while the wall $1a$ is indented by means of a notch 4 in the proximity of the transverse surface A. As a result of this, a cradle is furnished which is supported at the ends P3, P4, on which a further shorter cradle lies which is also supported at the ends P1, P2.

The extension measuring gauges 5 and 6 are provided on the transverse surface A, the supply leads of which extend to the branches of an electric bridge through the exhaust 7, with which bridge the mechanical changes can be converted into electric values in known manner.

It is of great advantage to use the measuring gauges 5 and 6 respectively which comprise a helically arranged double measuring wire as shown in FIG. 2. In this case, the electric bridge can be constructed from only two measuring gauges.

The moment of flexure at the measuring point 0 remains unchanged if the force P varies in the range from $P_1$ to $P_2$. In other words: P may act both via $P_1$ and also via $P_2$ or via any point in between, without the moment of flexure changing at the measuring point 0.

For the relationship from $L_2$ to $L_1$ any aspect ratios may be chosen, e.g. 3 to 2, 4 to 1 and so on. This does not change the result. It is even of advantage to keep the two extreme measures $L_1$ as small as possible since as a result the variation of the various moment curves at the measuring point 0 becomes flatter. It should be noted that also the bending moment becomes smaller and consequently also the dimensions of the cradle must be decreased if stresses and strains are to be maintained to the same extent.

In addition it is possible to provide several wall sections with the corresponding transverse surfaces. Alternatively, instead of the cylindrical shape of the tube, an elliptical or even a square or rectangular shape may be chosen, if desired, in which of course the component distribution should be observed.

What is claimed is:

1. A pressure measuring box comprising a strain gauge having extension measuring elements, a tube having a pair of elements closing the opposite open ends of said tube and having outer surfaces for receiving the pressure, said tube further being provided with sections of different wall thicknesses, and a transverse wall extending across said tube and connecting the tube sections of different wall thicknesses, said transverse wall containing said extension measuring elements of the strain gauges, said pressure being applied to the wall section of greater thickness and to a part of said transverse wall adjacent to the circumference thereof, and said circumference of said transverse wall being supported by said wall section of smaller thickness.

2. A pressure measuring box comprising a strain gauge having extension measuring elements, a tube having a pair of elements closing the opposite open ends of said tube and having outer surfaces for receiving the pressure, said tube further being provided with sections of different wall thicknesses, a groove in said tube section having a greater thickness than the other tube section, and a transverse wall extending across said tube and connecting the tube sections of different wall thicknesses, said transverse wall containing said extension measuring elements of the strain gauge, said pressure being applied to the wall section of greater thickness and to a part of said transverse wall adjacent to the circumference thereof, and said circumference of said transverse wall being supported by said wall section of smaller thickness.

3. A pressure measuring box as claimed in claim 1 wherein said extension measuring elements are helices arranged about said transverse wall.

4. A pressure measuring box as claimed in claim 1 wherein said tube is a hollow cylinder having an exhaust tube communicating therewith and extending laterally therefrom, and at least one notch in said wall of greater thickness for a more effective operation of said strain gauge.

References Cited by the Examiner

UNITED STATES PATENTS

| | | | |
|---|---|---|---|
| 2,360,886 | 10/1944 | Osterberg | 338—4 X |
| 2,535,998 | 12/1950 | Bierman | 338—4 |
| 2,784,593 | 3/1957 | Peucker | 338—4 X |

RICHARD M. WOOD, *Primary Examiner.*

MAX L. LEVY, *Examiner.*